UNITED STATES PATENT OFFICE.

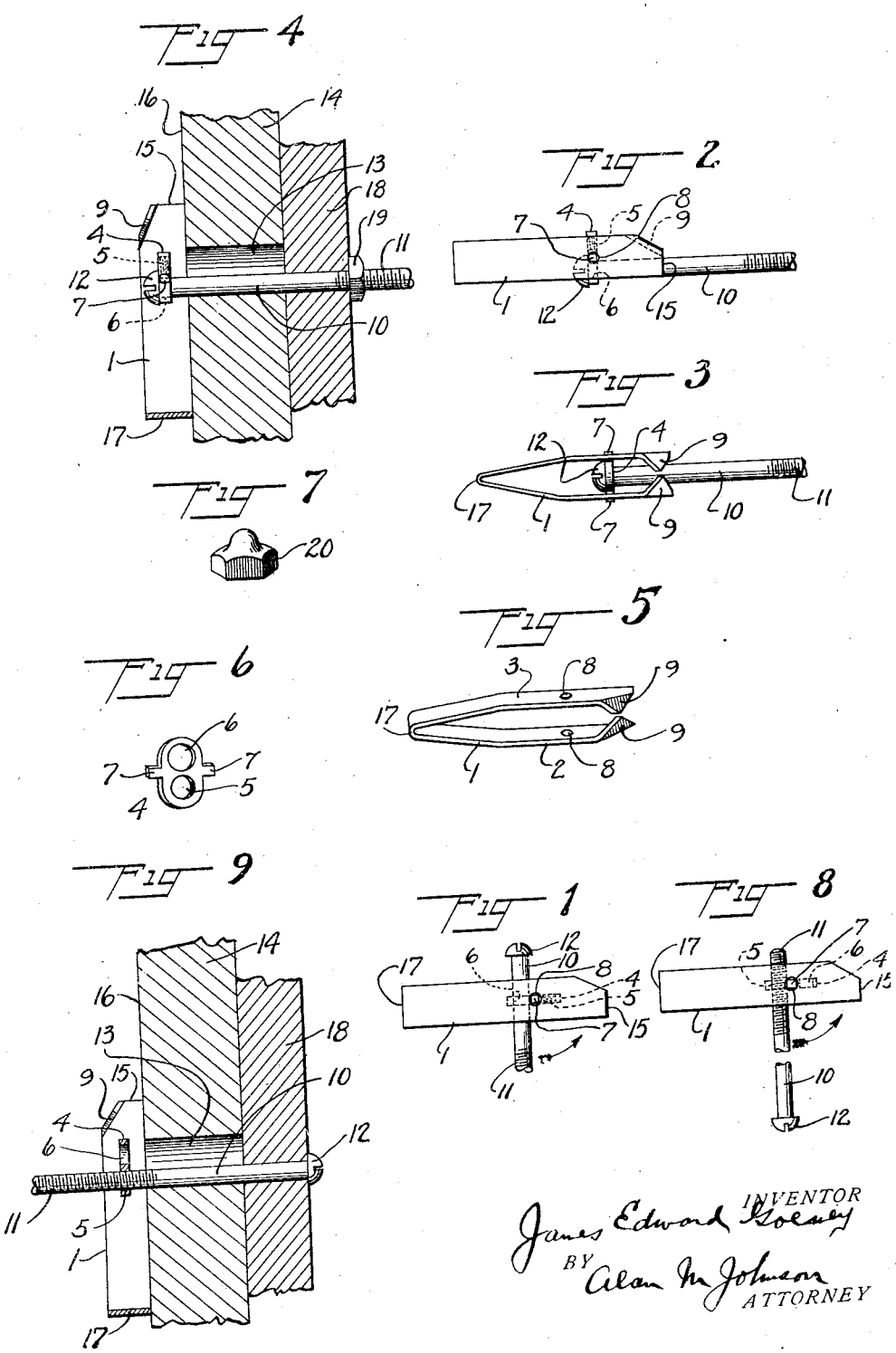

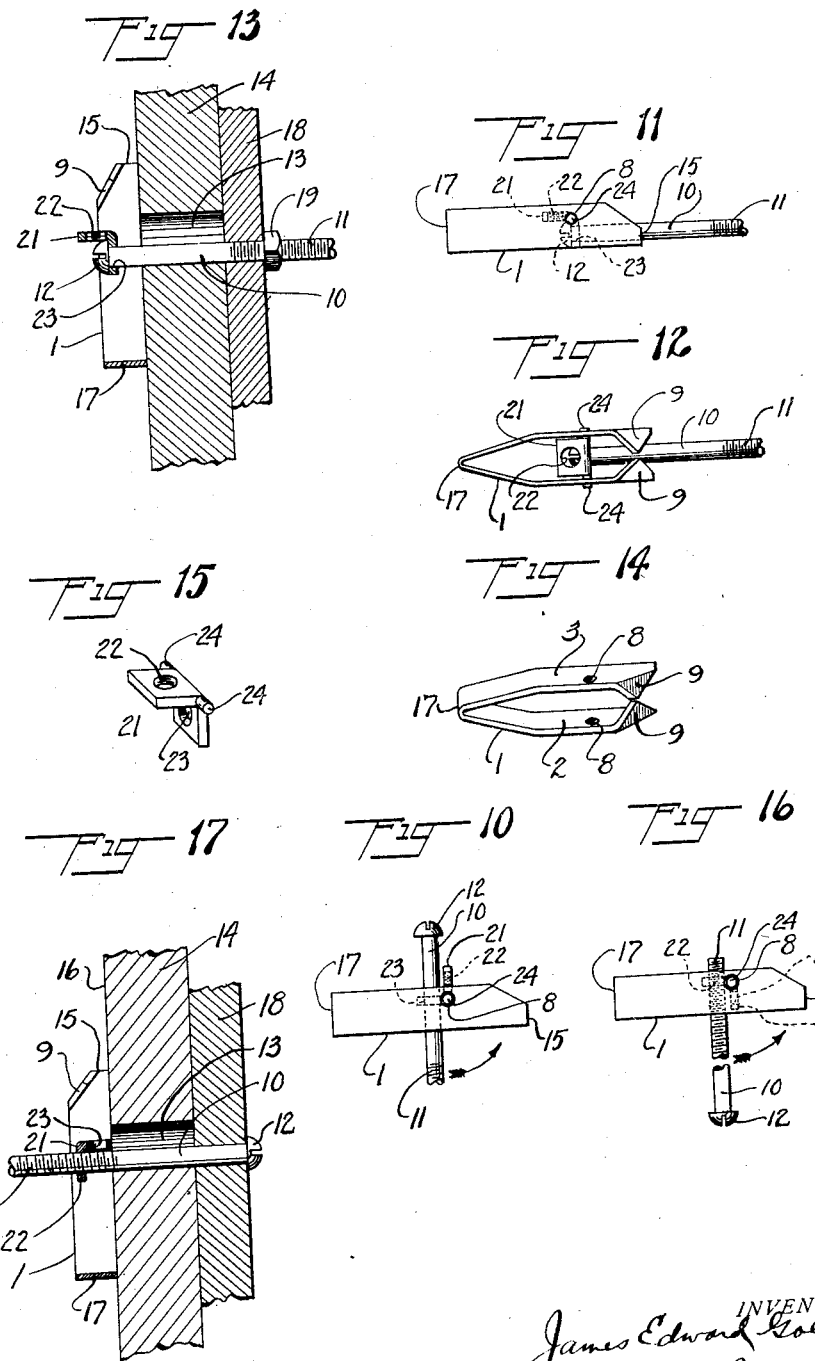

JAMES EDWARD GOEWEY, OF NEWARK, NEW JERSEY, ASSIGNOR TO DIAMOND EXPANSION BOLT COMPANY, OF NEW YORK, N. Y., A CORPORATION OF NEW YORK.

REVERSIBLE TOGGLE.

1,411,083.      Specification of Letters Patent.      Patented Mar. 28, 1922.

Application filed July 21, 1921. Serial No. 486,541.

*To all whom it may concern:*

Be it known that I, JAMES EDWARD GOEWEY, a citizen of the United States, residing at Newark, in the county of Essex and State of New Jersey, have invented certain new and useful Improvements in Reversible Toggles, of which the following is a specification, taken in connection with the accompanying drawings.

My invention relates to toggles and more particularly to one in which the bolt can be instantly reversed to conform with the particular requirements of the job, which may require either the head or the screw threaded shank to be exposed on the exterior of the work supported. It further relates to such a reversible toggle in which a movable member, usually a nut, is pivotally secured and held against accidental disengagement from the head, so that the nut will not become lost or misplaced in transit or in handling.

My invention further relates to such a nut provided with a screw threaded opening to cooperate with the screw threads of a bolt, and also provided with an additional opening to permit the screw threaded shank of the bolt to pass freely through it so that the head of the bolt can be mounted in contact with the nut and within the toggle head.

My invention further relates to certain combinations and details of construction which will be more fully hereinafter described and pointed out in the claims.

In the accompanying drawings I have shown different illustrative embodiments of my invention by way of example and in which the same reference numerals refer to similar parts in the several figures.

Fig. 1 is a side elevation, with the bolt partly broken away, showing the manner of dropping the bolt into the nut;

Fig. 2 is a side elevation showing the position of the parts after the bolt has been swung up in the direction of the arrow, Fig. 1, parallel with the toggle head;

Fig. 3 is a plan view of the toggle head and bolt shown in Fig. 2;

Fig. 4 is a vertical section through a wall, the toggle and the work to be supported;

Fig. 5 is a detail perspective view of the preferred form of my toggle head, the nut or pivoted member being omitted;

Fig. 6 is a perspective view of the nut or pivoted member;

Fig. 7 is a perspective view of one form of ornamental cap which I have shown by way of example;

Fig. 8 is a side elevation, similar to Fig. 1 with the exception that the nut or pivoted member has been rotated 180° and the screw threaded shank of the bolt has been made to cooperate with the threads in the nut;

Fig. 9 is a vertical section, similar to Fig. 4 with the exception that the bolt has been reversed so that the head will be exposed on the exterior of the work;

Fig. 10 is a side elevation similar to Fig. 1 but showing a different form of nut or pivoted member;

Fig. 11 is a side elevation showing the position of the parts after the bolt has been swung up in the direction of the arrows, Fig. 10, parallel to the toggle head;

Fig. 12 is a plan view of the structure shown in Fig. 11;

Fig. 13 is a vertical section similar to Fig. 4 showing this particular modification of my invention;

Fig. 14 is a perspective view of the toggle head used in this form of my invention;

Fig. 15 is a perspective view of the modified form of nut or pivoted member;

Fig. 16 is a side elevation, similar to Fig. 10, except that the nut or pivoted member has been rotated ninety degrees to permit its screw threaded opening to cooperate with the threaded shank of the bolt;

Fig. 17 is a vertical section similar to Fig. 13 with the bolt reversed. In this figure the head of the bolt is supported on the exterior of the work.

My invention is particularly adapted to make quick and permanent fastening to hollow tile, cement blocks, walls constructed of expanded metal or wood lath, brick and other forms of fire proof construction, or semi-fire proof construction, or other forms of building construction.

In some classes of work it is desirable that the head of the bolt appear on the exterior of the work to be supported; in other cases it is desirable that the screw threaded shank protrude from the surface of the work supported. When the shank of the bolt extends out from the work a nut of ordinary construction may be used, or any suitable object may be supported on the shank as by being screw threaded on it, or ornamental caps of any suitable description may be mounted upon the shank.

By my invention I permit the mechanic to instantly change my toggle bolt so that either the head of the cooperating bolt or its screw threaded shank can be exposed on the exterior of the work supported. I accomplish this result in my reversible toggle without adding any additional element and furthermore prevent the pivoted member or nut, held in the toggle head, from becoming lost or misplaced either in handling or in reversing the bolt.

In the different forms of my invention shown by way of example the head 1 of the toggle bolt is preferably formed from sheet metal bent back upon itself to form the two sides 2 and 3, Fig. 5. Within these sides 2 and 3 I mount a pivoted member 4 as shown for example in Fig. 6. This member is a nut having the screw threaded opening 5, and the larger unthreaded opening 6 together with the trunnions 7, 7. To position the pivoted member or nut 4 within the toggle head 1, it is merely necessary to bend out the sides 2 and 3 a sufficient distance to permit the trunnions 7, 7 to engage in the bearings 8, 8. The resiliency of the metal of the head will then cause the sides 2 and 3 to contract so that the pivoted member or nut 4 will be permanently secured to the toggle head and cannot become accidentally disengaged from it. The ends of the sides 2 and 3 are preferably, though not necessarily, bent in towards each other to form wings or stops 9, 9 to engage with the bolt 10 as shown in Figs. 2 and 3. While I preferably employ the form of toggle head 1 described and illustrated, it is, of course, to be understood that my invention is not to be confined to this particular form.

In shipping the toggle head the bolt 10, which may be of any suitable form, though preferably is an ordinary stove bolt of commerce, has its screw threaded shank 11 screwed into the screw threaded opening 5 of the nut 4, as shown for example in Fig. 8. This prevents the separation of the bolt and toggle head in transit or handling.

In using my reversible toggle bolt in a position where the requirement of the job necessitates the screw threaded shank 11 to be exposed on the outer surface of the work, the shank is screwed out of the nut 5. This nut is then rotated 180° from the position shown in Fig. 8 and brought into the position shown in Fig. 1, which will bring the unthreaded opening 6 to the left of the trunnions 7, 7. The bolt 10 is then dropped through the unthreaded opening 6 until the head 12 of bolt engages with the pivoted member or nut 4. The end of the shank 11 is then swung up in the direction of the arrow shown in Fig. 1 until the shank engages with the wings or stops 9, 9, if such wings or stops are employed. The parts will then be in the position shown in Figs. 2 and 3. The toggle head 1 is then pushed through the opening 13 in the wall or partition 14. As soon as the ends 15, 15 of the sides 2 and 3 of the toggle head escape the rear surface 16 of the wall 14, the end 17 of the toggle head will swing down into the position shown in Fig. 4, as it is heavier and overbalances that portion of the toggle head on the other side of the trunnions 7, 7. The end of the shank 11 is then passed through the work 18 which is secured to the wall or other suitable support 14 by means of the nut 19. Any suitable ornamental cap 20, Fig. 7, may be used either in connection with nut 19 or without it, or any desired object may be supported on the end of the shank 11.

In those cases where it is desirable to let the head 12 of the bolt contact with the exposed surface of the work, the bolt 10 is unthreaded from the nut 4, passed through the work 18 and again threaded into the screw threaded opening 5 of the nut 4. The toggle head 1 is then passed through the opening 13 as shown in Fig. 9. In this position of the parts the work 18 can be clamped to the surface of the wall 14 by simply rotating the bolt 10 in the nut 4 by means of a screw driver or other tool.

Different forms of pivoted members or nuts can of course be employed with my invention. I have shown for purposes of example another form in Figs. 13 to 17 in which the pivoted member or nut 21 is formed angular. In this form the toggle head 1 is the same as in the construction just described. The nut or pivoted member 21 is provided with a screw threaded opening 22 to cooperate with the screw threads upon the shank 11 of the bolt 10, and is also provided with an enlarged opening 23, the two openings 22 and 23 being at an angle to each other. This pivoted member is located within the toggle head 1 in any suitable manner such as by having its trunnions 24, 24 cooperate with the bearings 8, 8 in the toggle head. Assuming that it is desirable, for the particular job, to have the screw threaded shank of the bolt exposed on the exterior of the work 18, the parts are brought into the position shown in Fig. 10, the shank 11 of the bolt 10 being dropped through the unthreaded opening 23. The shank is then swung up as shown by the arrow in Fig. 10, until it becomes parallel with the head, Figs. 11 and 12. The toggle head 1 is then passed through the opening 13 in the wall 14 in the same manner described in connection with the other construction, and the work 18 is secured in the same manner.

If it is desirable to reverse the bolt it is merely necessary to pull it up through the unthreaded opening 23 until it is clear of said opening, then rotate the pivoted nut 21, 90° and thread the end of the shank 11 through the screw threaded opening 22 of the nut, Fig. 16, the work 18 having been first positioned upon the bolt. The work and the bolt are then swung up in the direction of the arrows, Fig. 16, until the bolt and toggle head 1 are parallel, as shown for example in Figs. 11 and 12, where, however, the bolt is reversed. The toggle head 1 is then passed through the opening 13 in the wall 14 and permitted to swing down as shown in Fig. 17. The work 18 is securely held to the face of the wall or other suitable support 14 by screwing the bolt 10 in the screw threaded portion 22 of the nut 21.

Having thus described this invention in connection with illustrative embodiments thereof, to the details of which I do not desire to be limited, what is claimed as new and what is desired to secure by Letters Patent is set forth in the appended claims.

What I claim is:—

1. In a reversible toggle bolt the combination of a toggle head, a member mounted in the toggle head, said member being provided with means to cooperate with either the screw threaded shank of a bolt, or with the head of a bolt to permit the bolt to be reversed in the toggle head.

2. In a reversible toggle bolt the combination of a toggle head, a pivoted nut mounted in said toggle head, said nut being also provided with means to cooperate with the head of a bolt to permit the bolt to be reversed.

3. In a reversible toggle bolt the combination of a toggle head and a pivoted nut secured to the head having a screw threaded and a non-screw-threaded opening through it.

4. A new article of manufacture comprising a nut to be used with a toggle head, said nut having two openings through it, one screw-threaded and one unthreaded.

5. A new article of manufacture comprising a nut to be used with a toggle head, said nut being provided with trunnions and having two openings through it, one screw-threaded and one unthreaded.

6. In a reversible toggle bolt the combination of a toggle head formed by bending a piece of sheet metal back on itself, a pivoted nut mounted in said head, said nut being provided with two openings, one screw-threaded to cooperate with the threads upon the shank of a bolt, and the other opening being unthreaded to permit the shank of the bolt to pass freely through it until the head of the bolt engages with the nut.

7. A new article of manufacture comprising a reversible toggle head having a pivoted nut secured against accidental disengagement, said nut being provided with means to cooperate with either the shank or head of a bolt to permit the bolt to be reversed in the nut.

JAMES EDWARD GOEWEY.

Witnesses:
 OSWALD FORRES,
 CHARLES N. FRÖHLICH.